United States Patent [19]

Shannon et al.

[11] Patent Number: 4,903,295
[45] Date of Patent: Feb. 20, 1990

[54] COMPACT SOLID STATE STATION PROTECTOR DEVICE

[75] Inventors: William Shannon, Saco; John Napiorkowski, Cape Elizabeth, both of Me.

[73] Assignee: GTE Products Corporation, Stamford, Conn.

[21] Appl. No.: 82,625

[22] Filed: Aug. 7, 1987

[51] Int. Cl.[4] .............................................. H04M 7/00
[52] U.S. Cl. ...................................... 379/437; 379/412
[58] Field of Search ........................... 361/56, 91, 119; 379/412, 405, 413

[56] References Cited

U.S. PATENT DOCUMENTS

| | | | |
|---|---|---|---|
| 4,307,430 | 12/1981 | Montalto et al. | 361/124 |
| 4,554,609 | 11/1985 | Ruehl et al. | 361/119 |
| 4,661,979 | 4/1987 | Jakab | 379/412 |
| 4,695,916 | 9/1987 | Satoh et al. | 361/56 |
| 4,729,055 | 3/1988 | Dorival et al. | 361/119 |

*Primary Examiner*—Michael J. Tokar
*Attorney, Agent, or Firm*—James Theodosopoulos

[57] ABSTRACT

The present invention discloses a compact solid state protector unit which comprises an inner insert structure, and an outer cover member having an open base end and adapted to be removably disposed over the insert structure, and a base member adapted to releasably seal the open base end of the cover member. The inner insert structure is constructed and arranged to support the components of a protector circuit mounted thereon in insulated spaced relationship. The disclosed protector circuit comprises two bidirectional solid state voltage sensitive switch devices with an associated ground terminal, two variable resistance devices, and line protector means for protecting the solid state protector unit from high voltage transients and abnormal currents. In the preferred embodiment disclosed, the cover member is provided with telephone line side test access holes and the contact pins of the protector unit are constructed and arranged to permit the protector unit to be disconnected from the central office equipment while maintaining contact with the telephone line side to permit testing.

7 Claims, 4 Drawing Sheets

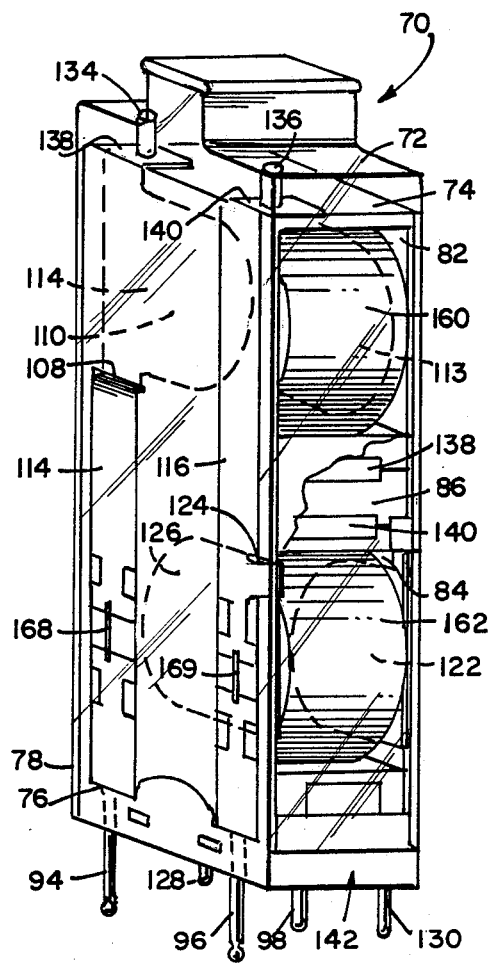
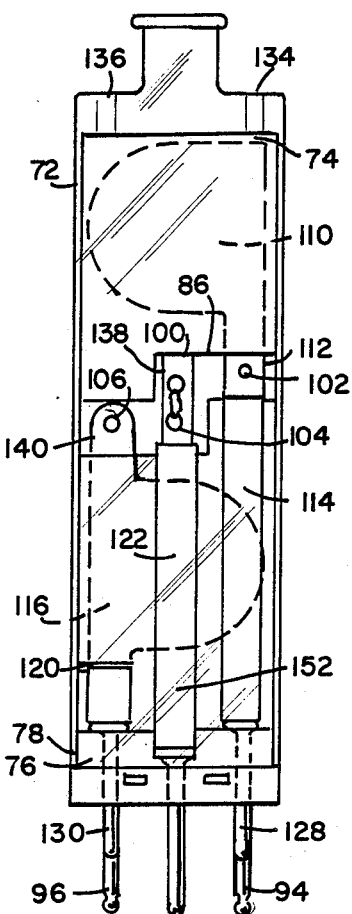
FIG. 3
FIG. 4

COMPACT SOLID STATE STATION PROTECTOR DEVICE

FIELD OF THE INVENTION

The present invention relates generally to the field of telephony, and more particularly to a new and improved compact solid state protector unit for protecting the solid state electronic circuits of telephone equipment in the central office or business from high-voltage transients and abnormal currents.

BACKGROUND OF THE INVENTION

Electronic circuits using small signal transistors and integrated circuits are easily damaged by high voltage transients that may appear on the line due to lightning, switching transients, or power line induction. Accordingly some form of transient and over-voltage protection must be used to protect the solid state circuits contained in Central Office equipment of local telephone companies or in the so-called "station" equipment at a customer's premises.

Since technology used for making integrated circuits contained in this equipment cannot provide high enough breakdown voltage, other protection devices are employed. For example, one or more external zener diodes are placed across the line to provide over-voltage protection. When the input voltage exceeds the zener (breakdown) voltage, the zener conducts and holds the voltage input to the electronic circuit at the rated zener voltage. In other prior art devices, metal oxide varistors are connected from the protected line to ground on another line. Still other prior art devices employ ionization of a gas between two electrodes to provide a voltage breakdown device. Prior art protection against abnormal currents employ such mechanical devices as heat coils or fuses. Also standard enclosures have been developed in which such prior devices are mounted during use.

While such prior art devices provide results in the area intended, there still exists a great need for a new and improved protector unit which employs existing components, and maximizes operating range and minimized cost. Additionally, it is important that solid state protector units be constructed to mount easily into standard enclosures which have been developed for used in Central Offices and so-called "Building Entrance Terminals", which are multi-line (12-,25-,50-,100-,and 200- lines, for example) equipment boxes installed for business and apartment buildings.

Accordingly, a principal object of the present invention is to provide a compact solid state protector unit for use as a protector for solid state Central Office and multi-line telephone station equipment.

Another object of the present invention is to provide a compact solid state protector unit which is constructed and arranged to be mounted in standard Central Office and Building Entrance Terminal equipment jacks.

A still further object of the present invention is to provide a compact solid state protector unit having access means for testing the electrical characteristics of the telephone lines.

A still further object of the present invention is to provide a compact solid state protector unit which is constructed and arranged to permit partial disconnection of the premises equipment from the telephone loop itself.

Other objects and advantages of the invention will in part appear hereinafter and will in part become apparent after consideration of the specification with reference to the accompanying drawings.

SUMMARY OF THE INVENTION

The present invention involved a compact solid state protector unit which protects the electronic circuits of telephone equipment installed at the Central Office equipment or the customer's station equipment from high voltage transients and abnormal currents which would damage the electronic circuits of this telephone equipment.

Briefly stated, the present invention involves a compact solid state protector package having an inner insert structure, and an outer cover member having an open base end and adapted to be removably disposed over the insert structure, and a base member adapted to releasably seal the open base end of the cover member. The inner insert structure is constructed and arranged to support the components of a protector circuit mounted thereon in spaced relationship. The disclosed protector circuit comprises two bidirectional solid state voltage sensitive switch devices with an associated ground terminal, two variable resistance devices, and fail-safe protector means for protecting the solid state protector device from catastrophic high voltage transients and abnormal currents. In the preferred embodiment disclosed, the cover member is provided with line-side test access holes. Additionally, the line-side pins of the protector unit are constructed and arranged to permit the protector unit to be disconnected from the premises (either Central Office or station) equipment, while still maintaining contact with the line-side.

The protector unit of the present invention provides protection of electronic equipment from voltage surges by electronically switching the voltage surge from line to ground. Additionally, the protector unit protects the electronic equipment and itself from high current surges on the line by increasing the impedance of the line thereby reducing the current to the equipment to a safe level. Upon cessation of the high voltage or current surge, the activated protector device returns to the inactive or idle state, allowing the telephone loop to function in the usual manner.

BRIEF DESCRIPTION OF THE DRAWINGS

FIG. 3 is a perspective view of an embodiment of the protector unit in accordance with the present invention.

FIG. 4 is a side elevational view illustrating the bidirectional switch and associated ground as disposed on the right side of the protector unit of FIG. 3 and as shown of the office side of the circuit of FIG. 2.

DETAILED DESCRIPTION OF THE PREFERRED EMBODIMENTS

Figure 1:
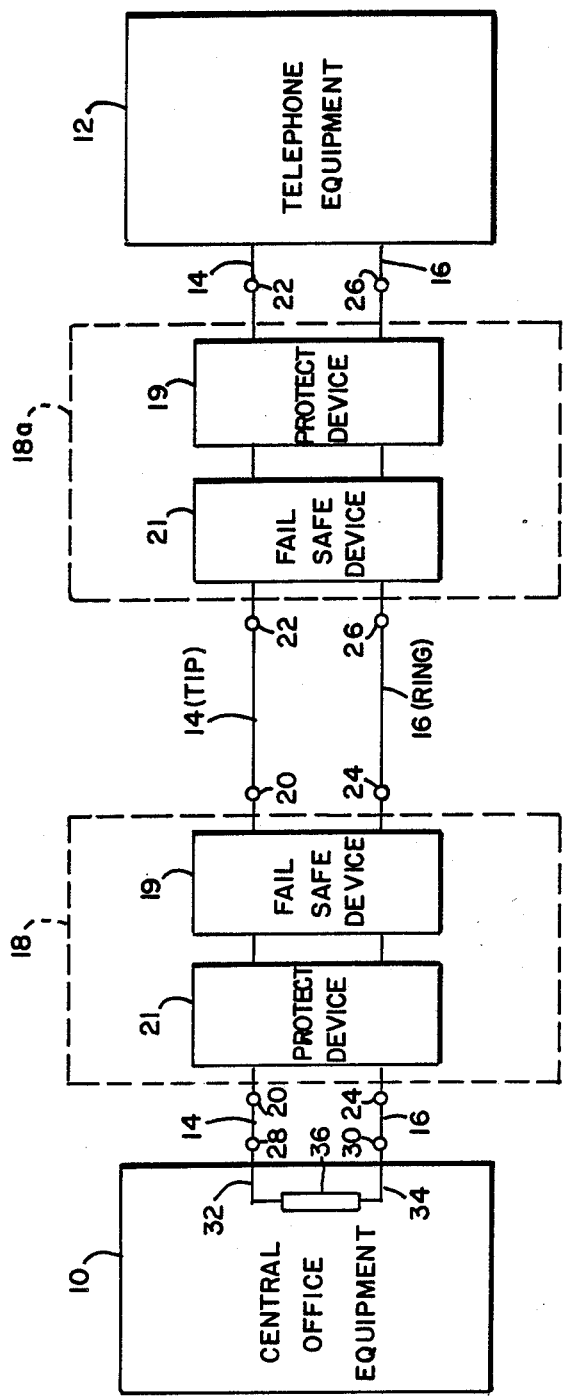
FIG. 1 is a schematic block diagram illustrating one application of the present invention.

Before providing a detailed description of the disclosed embodiment, a review of the basic operation of the interface connection (the local loop) between the Central Office that contains switching equipment, signaling equipment and power supply to operate a customer's station unit would be considered useful in understanding the invention. Referring particularly to FIG. 1 of the drawing, the Central Office equipment 10 and the customer's station unit, for example, electronic telephone equipment 12, are interconnected through a local loop of two wire conductors 14 and 16 called a pair. One of the conductor wires 14 is called T (for Tip) and the other conductor wire 16 is called R (for Ring) which refers to the Tip and Ring parts of the plug used in manual switchboards. The protector unit of the present invention is shown generally at 18 and 18a is preferably installed in the loop at both the Central Office 10 (18a) and the Building Entrance Terminal 12 (18). In accordance with standard basic operations, the Central Office 10 supplies 48 volts DC (+/−2 V) between the Tip 14 and Ring 16 connections at all times, with the Tip being at the more positive voltage potential. It should be understood that the polarity of the normal input voltage is critical for electronic circuits since they will not work or operate if the polarity is reversed. Accordingly, a polarity protector unit, not shown, can be placed in the loop circuit between the protector unit 18 and the telephone equipment 12. As is well known, the method commonly used to protect against polarity reversal is a conventional rectifier bridge since the output voltage polarity is always the same regardless of the input voltage polarity. As shown in FIG. 1, the protector units 18 and 18a are electrically connected to the Tip conductor wire 14 at suitable contact 20 and 22 and similarly to the Ring conductor wire 16 at contact points 24 and 26. The Tip and Ring conductors 14 and 16 at connected at contact points 28 and 30 to the electrodes 32 and 34 of current source 36 which may be an AC or DC source as is well known.

Figure 2:
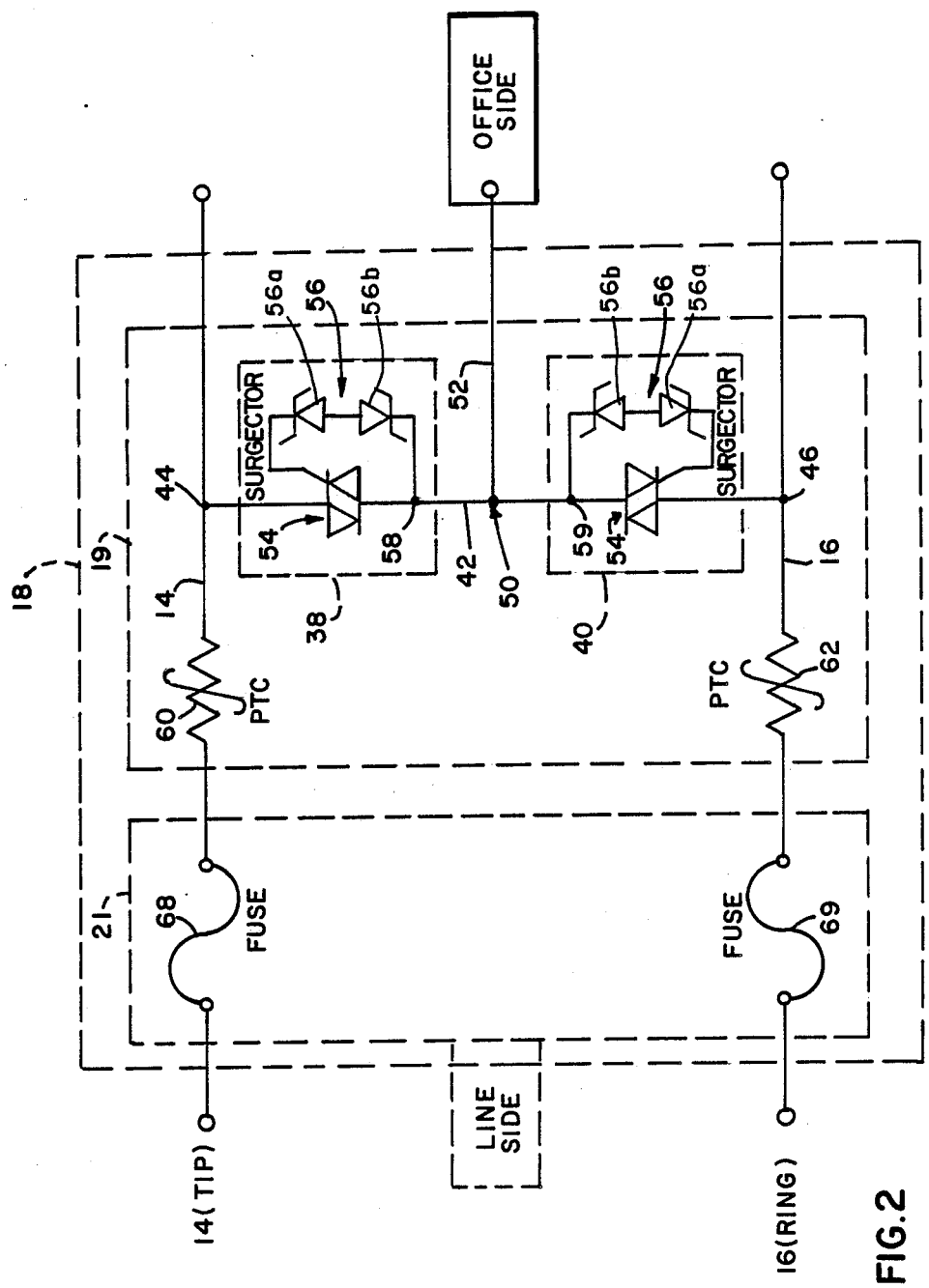
FIG. 2 is a schematic diagram of one embodiment of a protector circuit employed in the protector unit of FIG. 1.
Figure 7:
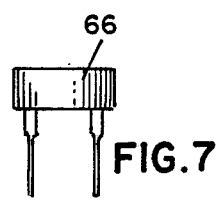
FIG. 7 is an enlarged elevational view of one embodiment of a bidirectional voltage sensitive switch device of the type employed in the present invention.
Figure 8:
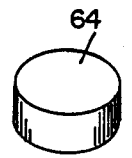
FIG. 8 is a perspective view of one embodiment of a variable resistance device of the type employed in the invention.

Referring now more particularly to FIG. 2, there is illustrated an enlarged schematic diagram of an embodiment of the protector circuit of the protector unit of the present invention as applied to the loop circuit of FIG. 1. For simplicity of discussion, the protector unit of the present invention will be described with respect to the Central Office although it is understood that the discussion applies equally to the Building Entrance Terminal. As illustrated, the circuit comprises two bidirectional solid state voltage sensitive switch means (VSS) 38 and 40 connected on conductor 42 across the Tip and Ring conductors 14 and 16 at contact points 44 and 46. Connected at contact point 50 on conductor 42 between switches 38 and 40 is a common ground 52. The bidirectional or bilateral voltage sensitive switch means (VSS) 38 and 40 each comprises a gated triac 54 and a pair of zener diodes 56a and 56b and together represented generally by the numeral 56 are connected to the gate of the triac and the conductor 42 at points 58 and 59 on conductor 42. As is known, the triac is equivalent to two silicon controlled rectifiers (SCRS) connected in parallel whereby the triac can switch both polarities of direct and alternating voltage and current. The protector circuit further includes a variable resistance means 60 and 62 which are connected in series in the Tip and Ring line 14 and 16 respectively before the voltage sensitive switch means 38 and 40. The variable resistance means 60 and 62 are preferably positive temperature coefficient (PTC) resistance devices, which vary their resistance in direct proportion to the applied current. Suitable PTC devices can be semiconductor ceramic discs having metal electrodes on both faces as shown at 64 in FIG. 8. One suitable PTC device is GTE Part Number P068E40A2575B0058. Suitable VSS devices can be, for example, the VSS device by RCA under the name "SURGECTOR" as shown at 66 in FIG. 7. Note that the bidirectional VSS devices discussed above can be replaced by unidirectional VSS devices when a conventional rectifier bridge, as previously mentioned, is used.

The protector circuit also includes a fail-safe device 21 which comprises a pair of current limiting means such as fuse elements 68 and 69 connected respectively in conductors 14 and 16 which protect the device 19 from severe abnormal electrical disturbances.

In operation, referring now to FIGS. 1 and 2, during normal conditions, signals travel from the Central Office equipment 10 to the customer's station equipment 12 via the Tip and Ring conductors 14 and 16, with essentially no current flowing through the bidirectional voltage sensitive switch means 38 or 40 due to the selected high impedance level of the bidirectional switch means 38 and 40. When a voltage surge occurs which is greater than the selected breakdown voltage of a Zener diode 56a,b the Zener diodes conduct to bias the bidirectional switch 54 which is then "turned on" and conducts current, thereby shunting the fault energy to ground 52. The fault energy also flows through the variable resistance means 60 and 62, and if the energy is substantial enough, the resistance of means 60 and 62 increases by self-heating, reducing the current flow to acceptable levels. This resistance increase also causes a corresponding voltage drop increase across the means 60 and 62, instead of the telephone equipment, thereby protecting the equipment.

When the current or voltage surge decreases below a selected value of the diode 56, the voltage across the diode is not sufficient for conduction with the result that the current to the bidirectional switch 54 is terminated and the switch is "turned off", no longer shunting the fault energy to ground. Operation then returns to normal.

Referring now to FIGS. 3 to 6, there is illustrated at 70 a preferred embodiment of the protector unit of the present invention. As illustrated, the protector unit 70 includes a cover 72 preferably formed or molded from a high temperature resistant plastic that is also resistant to moisture, chemicals and cracking at low temperature and a removable inner insert member 74. The cover member 72 is provided with an opening 76 at the base end 78 to receive the insert member 74 and a grip or handle means 80 to assist in the unit's installation by the user.

The insert member 74 is constructed and arranged to support the protector circuit shown and described with respect to FIG. 2. As shown, the insert member 74 is provided with a pair of chambers or cavity means 82 and 84 to receive the PTC (thermistor) devices 160 and 162. Disposed within the center section 86 of the insert member 74 are the VSS devices 138 and 140 of the type shown in FIG. 7.

Figure 5:
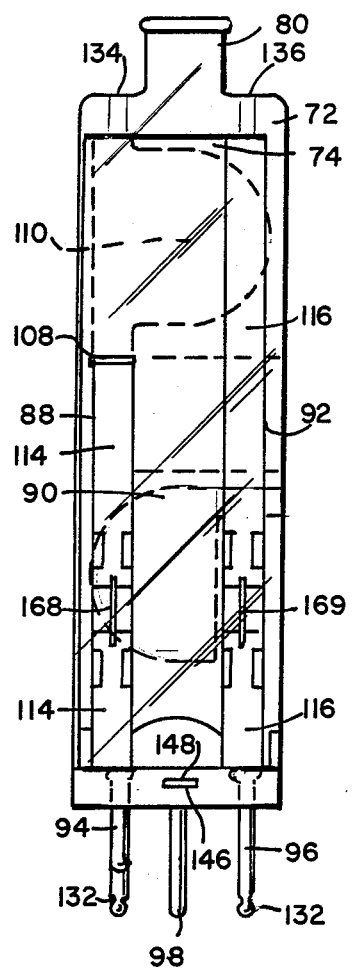
FIG. 5 is a side elevational view of the left side of the protector unit of FIG. 3 illustrating the fuse elements as shown on the line side of FIG. 2.
Figure 6:
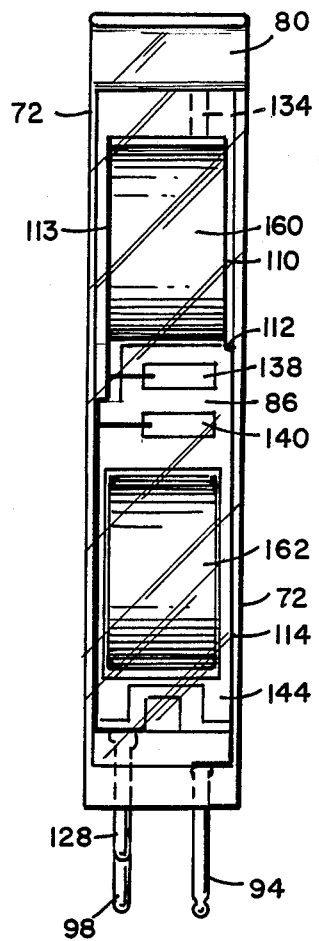
FIG. 6 is a side elevational view of the rear side of the protector unit of FIG. 3 illustrating the arrangement of the bidirectional voltage sensitive switch devices and the variable resistance devices.

Referring now more particularly to FIG. 5, the lower portion of conductor 114 is disposed in channel means 88 which has sufficient depth whereby the top surface of conductor 114 is flush with the surface 90 of the insert member 74. In the same manner, conductor 116 is disposed in channel means 92 to provide a flush mounting with insert surface 90. Fuse means 168 and 169 are connected respectively in the lower portions of conductors 114 and 116. The lower portions of conductors 114 and 116 terminate in line side pin contacts 94 and 96 and are coextensive in length with the ground pin contact 98 (which is connected to ground conductor 152 as best seen in FIG. 4) and form the Tip and Ring contacts on the line side. Referring now more particularly to FIG. 4, the electrodes 100 and 102 of VSS device 138 are connected respectively to the ground conductor 152 and conductor 114. Similarly electrodes 104 and 106 of VSS device 140 are connected respectively to the ground conductor 152 and conductor 116. The upper portion of conductor 114 extends through slot 108 and forms a contact surface 110 (dotted line) adjacent the inner wall of cavity 82. In a similar manner, the other portion of conductor 114 (as best seen in FIGS. 4 and 6) extends through slot 112 and forms the upper contact surface 113 (dotted line). As can be seen, PTC device 160 is held in electrical contact between contact surfaces 110 and 112 to complete the Tip conductor as shown in FIG. 2. Similarly, the lower portion of conductor 116 extends through slot 120 (as best seen in FIGS. 3 and 4) and forms contact surface 122 (dotted line). In the same manner, the other portion of conductor 116 bends about the notch 124 and forms a corresponding contact surface 126 (dotted lines). As can be seen, PTC device 162 is held in electrical contact between surfaces 122 and 126 to complete the Ring conductor as shown in FIG. 2.

As best seen in FIG. 4, conductors 114 and 116 terminate respectively in pin contacts 128 and 130 which form the Tip and Ring contacts on the office side of the device. In accordance with another feature of the invention, the office-side Tip and Ring pins 128 and 130 are shorter than the line-side Tip and Ring pins 94 and 96. Thus, when the protector unit 70 is moved to the detent position of pins 94 and 96 on the line side, the office equipment is disconnected from the telephone loop and the protector unit. This feature permits testing of the line-side without removal of the protector unit from its jack (not shown). The testing of the line side is conveniently made through the test access holes 145 and 136 in the top of the cover member 72 whereby contact can be made with conductors 114 and 116 which are bent at their upper portions 138 and 140 to be in register with the respective adjacent access holes. The lower opening 76 of the cover member 72 is closed with the base assembly member 142. In the preferred embodiment, the base member 142 contains the office pins 128 and 130 and is provided with apertures (not shown) through which the line pins 94 and 96 and ground pin 98 pass as shown by the dotted lines. The upper portion 144 (as best seen in FIG. 6) of the base member 142 is formed to fit within the cover member 70 to thereby form the complete protector unit.

On at least two sides of the base member 142, there are provided notches 146 which fit into corresponding openings 148 in the base of cover 72 to releasably hold the cover and base in closed relationship.

The materials used to form the insert member, cover member and base member are preferably of the type which electrically insulate the various electrical components from each other while providing sturdy mechanical support during assembly and over the unit's life while installed, particularly when the environment is harsh, for example, when placed outside. It was found that glass-filled plastic materials satisfied these requirements.

While the invention has been described with respect to preferred embodiments, it will be apparent to those skilled in the art that changes and modifications may be made without departing from the scope of the invention herein involved in its broader aspects. Accordingly, it is intended that all matter contained in the above description shall be interpreted as illustrative and not in a limiting sense.

As our invention, we claim.

1. A compact solid state protector unit for Central Office Equipment and Building Entrance Terminal Equipment, said device comprising:
   an outer cover means having an open lower end;
   an inner insert member adapted to be inserted into said cover means;
   a pair of cavity means disposed in said insert member;
   a PTC variable resistance means disposed in each cavity means of said insert member;
   a chamber means disposed between said cavity means;
   a pair of VSS means disposed in said chamber means;
   channel means disposed upon the surface of said insert means;
   conductor means disposed in said channel means connecting said PTC variable resistance means and said VSS means to form a circuit having a pair of office-side conductors and a pair of line-side conductors;
   a pair of input terminal means connected to said line-side conductors and a pair of output terminal means connected to said office-side conductors;
   a ground terminal connected between said VSS means; and
   a base disposed in the lower end of said cover means.

2. The unit according to claim 1 wherein a fuse means is connected in series between each PTC means and the respective line-side terminals.

3. The unit according to claim 1 further including test means whereby to test the integrity of said telephone line side.

4. The unit according to claim 1 wherein said conductor means extend to the top of said insert, and further including aperture means in said cover in registry with said conductor means whereby a test probe can be inserted into said aperture to engage said conductor means and test the integrity of said circuit means.

5. The unit according to claim 1 wherein the line-side terminal means and the office-side terminal means are pins extending outwardly from the base, said line terminal pins being longer than said office terminal pins; and
   detent retaining means disposed adjacent the end of said line terminal means, whereby said unit can be disconnected from said office equipment while maintaining contact with the incoming telephone line by partially moving said device until said office terminal pins are disconnected from said office line side, said detent means being arranged to be releasably engaged by connectors in the office jack means.

6. The unit according to claim 1 wherein grip means are provided on the upper surface of said cover to facilitate the unit's installation by the user.

7. The unit according to claim 1 wherein releasable attachment members are disposed on the base and the lower end of the cover member to secure the cover member.

* * * * *